United States Patent [19]

Tsuchiya et al.

[11] 4,176,146

[45] Nov. 27, 1979

[54] PROCESS FOR PRODUCING CURABLE COATING RESINS

[75] Inventors: Shozo Tsuchiya, Tokyo; Hideo Hayashi; Makoto Sasaki, both of Yokohama; Kiyoshi Goto; Kazuyoshi Ihida, both of Tokyo, all of Japan

[73] Assignees: Nippon Oil Co., Ltd.; Toyo Ink Manufacturing Co., Ltd., both of Tokyo, Japan

[21] Appl. No.: 860,367

[22] Filed: Dec. 14, 1977

[30] Foreign Application Priority Data

Dec. 22, 1976 [JP]  Japan ................. 51/153436

[51] Int. Cl.² ............................ C08F 8/04; C08F 8/14
[52] U.S. Cl. ................................. 525/338; 525/339; 525/386; 526/308
[58] Field of Search .............. 526/56, 308, 25, 26; 260/879

[56] References Cited

U.S. PATENT DOCUMENTS

| | | | |
|---|---|---|---|
| 2,689,232 | 9/1954 | Gerhardt | 260/23.7 |
| 3,957,736 | 5/1976 | Tsuchiya et al. | 526/11.1 |
| 4,037,038 | 7/1977 | Tsuchiya | 526/56 |

*Primary Examiner*—William F. Hamrock
*Attorney, Agent, or Firm*—Frank J. Jordan

[57] ABSTRACT

A process for preparing a curable coating resin comprising the steps of hydrogenating selectively the double bonds of a resin produced from a five-membered cyclic compound such as dicyclopentadiene and an unsaturated hydroxyl group-containing compound such as allyl alcohol and then esterifying the thus hydrogenated hydroxyl group-containing resin with acrylic and/or methacrylic acid thereby to obtain a curable coating resin; and a curable coating resin obtained by said process.

7 Claims, No Drawings

PROCESS FOR PRODUCING CURABLE COATING RESINS

This invention relates to a process for the production of novel resins, particularly resins for use in inks, curable under the action of radiation or heat.

With the progress of printing techniques, the speed-up of printing has recently been demanded. Thus, it has been required with increasing severity that printing inks have rapid drying capability or rapid curability. In conventional high speed printing, direct fire type or hot gas type heating has been employed to dry printing matter as the means for accelerating the drying. Printing inks as used in such heat-set printing will be dried by heating to evaporate the solvent contained in the inks in the amounts of 30 to 40% by weight thereof. Therefore, in printing factories wherein such heat-set printing is carried out, part of the solvent used is discharged into the atmosphere of the factories thereby tending to raise problems as to environmental pollution. Thus, printing inks which do not contain such volatile matter and are capable of being dried by the use of some means, have been sought by those in the art.

Such being the case, there have been sought printing inks, such as ultraviolet light curable inks and heat curable solvent-free inks, which will dry without being accompanied by evaporation of solvents; several such inks have already been proposed.

Japanese Patent Application Laying-Open Gazette No. 124133/74 discloses that if used in the preparation of curable inks, then resins obtained by the esterification of a dicyclopentadiene-allyl alcohol copolymer with acrylic or methacrylic acid will exhibit excellent compatibility and crosslinkability. However, if such resins be used in the preparation of offset ink compositions, then they will exhibit the following disadvantages:

(1) The printability of the ink composition is insufficient, (2) The odor of the ink composition used is partly retained in the printing matter, (3) It is difficult to clean the used printing rollers with ordinary solvents for cleaning the offset printing rollers, (4) The ink composition is not sufficiently sensitive to ultraviolet light and (5) The resins have an unsatisfactory color and will therefore have adverse effects on the production of light-colored inks if used in the production thereof (the "light-colored" inks referred to herein meaning inks containing white-colored pigments, such as titanium oxide, whether in a low or high concentration, or those have a low concentration of pigments other than the white-colored pigments). Thus, said resins will raise trouble problems if put to practical use.

The present inventors made studies in an attempt to find a process for the preparation of resins which have none of the above-mentioned disadvantages and are further suitable for use in the preparation of solvent-free curable coating compositions and, as a result of their studies, they found such a process. This invention is based on this finding or discovery.

The process of this invention comprises:

hydrogenating selectively the double bonds of a resin (I) produced by reacting (A) a member selected from the group consisting of five-membered cyclic compounds having unsaturated conjugated double bonds and being represented by the following general formula

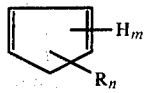

wherein R is an organic residue having 1 to 3 carbon atoms, and m and n are each an integer and are 6 in total (that is, m+n=6), and Diels-Alder's reaction products of the five-membered cyclic compound, with (B) a compound containing a polymerizable double bond and at least one hydroxyl group in the molecule, to obtain a hydroxyl group-containing resin (II) and then esterifying the thus obtained resin (II) with at least one member selected from the group consisting of acrylic and methacrylic acids thereby to obtain a curable coating resin (III).

According to the process of this invention for obtaining the resin (III), the components (A) and (B) are copolymerized to produce the copolymer resin (I), the copolymer resin (I) so produced is hydrogenated for selective hydrogenation of the double bonds contained therein to produce a light-colored resin (II) containing hydroxyl groups, and the hydroxyl group-containing resin (II) is then esterified with acrylic and/or methacrylic acid to obtain the esterified resin (III). If the resin (III) is used in the preparation of offset printing ink compositions, then it will exhibit the following advantages:

(1) The ink compositions have no odors,
(2) The resin has no adverse effects on the production of light-colored inks because of its suitable color,
(3) The printing rollers used may be cleaned with a hydrocarbon type solvent for cleaning printing rollers,
(4) The ink compositions have much improved printability, and
(5) The ink compositions have improved sensitivity to ultraviolet light.

Thus, the ink compositions of this invention will exhibit excellent performance when put to practical use.

The resin (I) is one obtained by copolymerizing at least one member, as the component (A), selected from the group consisting of cyclopentadiene, dicyclopentadiene, tricyclopentadiene, tetracyclopentadiene and those substituted with a $C_{1-3}$ lower alkyl group (such as methyldicyclopentadiene), with a hydroxyl group-containing unsaturated monomer as the component (B). In this specification, the component (A) shall hereinafter be represented only by "dicyclopentadiene" for brevity.

More particularly, the copolymer resin (I) of the dicyclopentadiene (component (A)) and the hydroxyl group-containing unsaturated monomer (component (B)) may be obtained by reacting the component (A) with the component (B) at 150° to 350° C. in the presence or absence of a radical polymerization catalyst and, if desired, in the presence of a suitable solvent. The molar ratio between the component (A) and the component (B) used in the aforementioned reaction may range from 30:70 to 95:5, preferably from 40:60 to 80:20. The copolymer resin (I) is a solid resin at ambient temperature. The softening point of such a resin to be produced may be determined depending on the purpose for which the resin is used and by the selection of reaction conditions such as reaction time and temperature, and it may usually vary from 50° to 200° C. In addition, it is not always necessary to use dicyclopentadiene of high purity in the preparation of the resins. For instance, there may also be used dicyclopentadiene of at least about 85% purity obtained by thermally dimerizing cyclopentadiene and methylcyclopentadiene contained in the $C_5$ fraction of an oil produced as the by-product at the time of thermocracking of naphtha or the like at high temperatures and then distilling the resulting reaction mixture to remove therefrom the greater part of the $C_5$ fraction including the $C_5$ olefins and $C_5$ paraffins.

The hydroxyl group-containing unsaturated monomers used as the component (B) in this invention are a compound having usually 3 to 40 carbon atoms and containing both a polymerizable double bond and at least one hydroxyl group in the molecule. They include (meth)allyl alcohol, 2-hydroxyethyl (meth)acrylate, 2-hydroxypropyl (meth)acrylate, 1,4-butenediol and mixtures thereof. The term "(meth)allyl" means "allyl and methallyl" and the term "(meth)acrylate" means "acrylate and methacrylate" throughout the specification.

The hydroxyl group-containing resin (I) obtained as previously mentioned contains many double bonds and is badly smelly and considerably colored. The resin (I) may be improved in odor and color by hydrogenating the double bonds contained in the resin (I) substantially without decreasing the hydroxyl groups therein thereby to obtain the resin (II).

As mentioned above, according to this invention, the resin (I) is hydrogenated only at the inter-carbon double bonds substantially without decreasing the hydroxyl groups. To this end, the hydrogenation conditions are necessary to determine carefully. In other words, said conditions should be such that it is as difficult as possible to hydrogenate the hydroxyl groups while it is as easy as possible to hydrogenate the double bonds. For example, it is desirable to use a noble metal catalyst such as platinum or palladium catalyst, as the hydrogenation catalyst and, in this case, the hydrogenation may be effected at a temperature of from ambient temperature to 250° C. and at a pressure of atmospheric pressure to 100 Kg/cm$^2$ substantially without decreasing the hydroxyl groups. Thus, the hydrogenation may be effected under the widely varying conditions.

If there is used a catalyst, such as a copper-chromium catalyst, other than the noble metal catalysts, then it will be necessary to carry out such hydrogenation at as low a temperature as possible, preferably at 200° C. or lower for example. If the reaction (or hydrogenation) temperature exceed 200° C., then the amount of the hydroxyl groups contained in the resin (I) will tend to decrease because of dehydration taking place, simultaneously with the hydrogenation of the carbon-to-carbon double bonds. Thus, the use of such high reaction temperatures is not desirable, while from ambient temperature to 200° C. is preferable.

The degree of hydrogenation in this invention is not particularly limited, but it is recommendable to hydrogenate at least 10%, preferably at least 40% and more preferably at least 80%, of the inter-carbon double bonds. The preferable reaction pressure ranges from atmospheric to 100 kg/cm$^2$.

The resin (II) so obtained is then esterified with acrylic and/or methacrylic acid in the presence or absence of a suitable catalyst under known esterifying conditions, whereby the hydroxyl group of the resin (II) are esterified with the carboxyl groups of acrylic and/or methacrylic acid thus obtaining the curable coating resin (III).

The esterification may be effected, for example, at 20°-150° C., preferably 80°-130° C., under atmospheric, superatmospheric or autogenous pressure in the presence of an acid catalyst such as p-toluenesulfonic acid, phosphoric acid, hypophosphorous acid, polyphosphoric acid, sulphuric acid or boric acid. Further, the esterification may further be effected in one or more of solvents such as benzene, methyl isobutyl ketone, cyclohexane and toluene and, if desired, under reflux thereof.

In this esterifying reaction, 0.5 to 1 mol of acrylic and/or methacrylic acid may be reacted with every mol equivalent of the hydroxyl groups of the resin (II) for the purpose of this invention, but a sufficient amount of acrylic and/or methacrylic acid may preferably be effected to ensure a substantially perfect esterification. In such cases, the use of less than 0.5 mol of the acid or acids will result in the production of an esterified resin having low curability, this being undesirable.

The curable resin (III) of this invention is the most suitable for use in the preparation of curable coating compositions for inks. There are indicated below examples of the constitutions of actually usable coating compositions for inks, in which the resin (III) is used.

1. Curable type (preferably, ultraviolet curable):
Resin (III): 30-80 wt.%
Pigment: 5-30 wt.%
Sensitizer: 3-30 wt.%
2. High speed printing type:
The above ultraviolet light curable type composition may be incorporated with a solvent, preferably a reactive solvent in an amount by weight of not more than 40% of the composition to obtain a low-viscosity ink.

The resin (III) may be incorporated with not more than 50% by weight of a suitable solvent, based on the total weight of the resin and solvent, for use as a vehicle.

If the resin (III) is to be used as a vehicle for offset printing inks, it will also be possible to use fatty oils or the fatty acid thereof, rosin derivatives, resol-type phenol resins or the like as additional reactive components in said esterifying reaction in order to improve the resin (III) in oleophilic property.

Since the coating resins (III) of this invention so obtained are easily curable under the action of heat or radiation such as ultraviolet light or electronic beam, they are very suitable for use particularly as a vehicle for printing inks. The curable coating resins have a softening point within the range of usually 30° to 150° C.; these having a softening point within the lower part of said range may be blended homogeneously with a pigment without the use of a solvent to obtain an ink since they are easily melted and fluidized by heating, while those having a softening point within the higher part of said range may be dissolved in a suitable solvent and then incorporated with a pigment to obtain an ink. Such solvents include many known ones such as aromatic and oliphatic hydrocarbons; however, it is desirable to use reactive solvents in order to ensure a particularly rapid and easy cure of the resin of this invention. The reactive solvent used herein is one or more of crosslinkable monomers which contain at least one reactive double bond and are crosslinkable with the esterified resin of this invention under the action of heat or radiation such as ultraviolet light or electronic beam. The crosslinkable monomers are preferably vinylic compounds such as acrylic acid derivatives and styrene, with acrylic acid derivatives being particularly preferred. Said compounds are crosslinkable monomers containing acrylic or methacrylic residue and include pentaerithritol tetra(meth)acrylate, pentaerithritol tri(meth)acrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol di(meth)acrylate, 2-hydroxyethyl (meth)acrylate, 2-hydroxypropyl (meth)acrylate, alkyl (meth)acrylates (alkyl: $C_1$-$C_{13}$) and glycidyl (meth)acrylate.

A curable coating composition prepared by dissolving the curable resin of this invention in the reactive solvent, has an excellent property such that it is cured very rapidly because of its crosslinking reaction by heat or radiation applied thereto. The curable coating composition will exhibit excellent performance particularly when it is contained in a curable offset printing ink. As compared with an ink composition wherein is used a resin obtained by reacting a dicyclopentadiene-allyl alcohol copolymer resin with acrylic or methacrylic acid as disclosed in Japanese Patent Application Laying-Open Gazette No. 124133/74, an ink composition wherein the curable coating resin of this invention is used is improved in the following points:

(1) The printability of the ink composition is satisfactory, (2) The printed matter obtained is not smelly at all, (3) The printing rollers used may be cleaned with an ordinary solvent for cleaning offset printing rollers, (4) The composition is satisfactory in sensitivity to ultraviolet light and (5) The curable resin of this invention is light-colored and it will therefore have no adverse effects on the production of light-colored inks.

Furthermore, when the ink composition is cured, the solvent used therein will be converted to a part of the resulting cured coating because of its participation in the crosslinkiing reaction without being evaporated for discharge as ordinary organic solvents, thereby raising no problems as to the solvent evaporation involving environmental pollution.

The pigments which may preferably be used herein include Carmine 6B, phthalocyanine blue and Benzidine Yellow.

When the curable coating resin of this invention is used as a vehicle for printing inks for example, it may be used with a cure accelerator to promote the cure thereof and this is advisable in many cases. When the aforesaid ink composition is cured by heating, an organic peroxide (such as benzoyl peroxide, lauroyl peroxide or azobisisobutyronitrile) may be used alone or together with a decomposition accelerator (such as an organic or inorganic acid salt of Mn, Mo or other heavy metals) as a cure accelerator or else certain ketonic resins may be used as a heat cure accelerator. Further, when said ink composition is cured by ultraviolet light radiation, there may be used as a cure accelerator a sensitizer such as a benzoin ether, benzophenone, benzil, benzoquinone or tetramethylaminobenzophenone.

This invention will be better understood by the following Examples wherein all percentages and parts are by weight unless otherwise specified.

EXAMPLE 1

To an autoclave provided with a stirrer were added 660 g of dicyclopentadiene of 96% purity, 300 g of allyl alcohol and 500 g of commercially available mixed xylene to form a mixture which was reacted at 260° C. for 5 hours. After the end of the reaction, the autoclave was cooled and the reaction mixture was distilled to remove therefrom the unreacted monomer, low polymers and mixed xylene, thereby obtaining 750 g of a resin (I)-1. One hundred (100) grams of the resin (I)-1 so obtained were dissolved in 75 g of commercially available mixed xylene, incorporated with 1 g of Palladium-Carbon containing 5% of palladium (5% Pd-C Standard product prepared by Nippon Engelhardt Co., Ltd.) and hydrogenated at a hydrogen pressure of 30 Kg/cm² and a temperature of 150° C. for about one hour to obtain a reaction mixture which was freed of the solvent by distillation-off thereof thereby to obtain a hydrogenated resin (II)-1. The resins (I)-1 and (II)-1 had the properties as shown below.

| | Softening point | Bromine value | Hydroxyl group content (g equivalent/100g) | Color (Gardner) |
|---|---|---|---|---|
| Resin (I)-1 | 90° C. | 74 | 0.37 | 10 |
| Resin (II)-1 | 87° C. | 16 | 0.37 | 3 |

Then, 80 parts of the resin (II)-1, 20 parts of acrylic acid, 1.0 part of p-toluenesulfonic acid and 0.1 part of hydroquinone were charged into a flask provided with a side arm-fitted condenser and a stirrer to obtain a mixture which was reacted under reflux of benzene/methyl isobutyl ketone (MIBK) at 100° C. for about 12 hours, after which the reaction mixture was freed of the benzene and MIBK by distillation-off thereof at 120° C. thereby to obtain a resin (III)-1. The hydroquinone was used as a polymerization inhibitor.

EXAMPLE 2

One hundred (100) grams of the resin (I)-1 as obtained in Example 1 were dissolved in 70 g of cyclohexane under heat, incorporated with 0.5 g of platinum-carbon powder carrying 5% of platinum thereon as the catalyst and then hydrogenated at a hydrogen pressure of 10 Kg/cm² and a temperature of 100° C. for about one hour thereby to obtain a resin (II)-2 having a softening point of 86° C., bromine value of 20, hydroxyl group content of 0.36 g equivalent/100 g and Gardner color of 3.

Then, 75 parts of the resin (II)-2, 25 parts of acrylic acid, 1.0 part of p-toluenesulfonic acid and 0.1 part of hydroquinone were introduced into a flask provided with a side arm-fitted condenser and a stirrer to obtain a mixture which was reacted under reflux of cyclohexane/MIBK at 100° C. for about 10 hours. The resulting reaction mixture was freed of the cyclohexane and MIBK by distillation-off thereof thereby to obtain a resin (III)-2.

EXAMPLE 3

One hundred (100) grams of the resin (I)-1 as obtained in Example 1 were dissolved in 70 g of isopropyl alcohol under heat, incorporated with 2 g of Raney nickel as the catalyst and then hydrogenated at a hydrogen pressure of 30 Kg/cm² and a temperature of 150° C. for about 2 hours thereby to obtain a resin (II)-3. The resin so obtained had a softening point of 88° C., bromine value of 23, hydroxyl group content of 0.34 g equivalent/100 g and Gardner color of 4.

Then, 70 parts of the resin (II)-3, 30 parts of acrylic acid, 1.0 part of p-toluenesulfonic acid and 0.1 part of hydroquinone were reacted together at 100° C. for about 10 hours to obtain a resin (III)-3.

EXAMPLE 4

A C₅ fraction boiling within the range of 29° to 60° C. obtained by cracking naphtha was heated to 110° C. for 5 hours, after which the thus heated fraction was freed of the C₅ fraction thereby leaving a residual oil which contained 85% of dicyclopentadiene (DCPD) and the balance comprising a cyclopentadiene-piperylene codimer or cyclopentadiene-isoprene codimer. One hundred and fifty-five (155) grams of the residual oil containing 85% of DCPD, 58 g of allyl alcohol, 20 g of rosin and 70 g of xylene were charged into an autoclave. The resulting mixture was reacted at 260° C. for 5 hours and freed of the unreacted monomers, low polymers and solvent by distillation thereof, thereby to obtain 180 g of a resin (I)-2 having a softening point of 85° C., bromine value of 80, hydroxyl group content of 0.34 g equivalent/100 g and Gardner color of 10.

One hundred (100) g of the resin (I)-2 were dissolved in 100 g of isopropyl alcohol under heat and hydrogenated in the presence of 2 g of Raney nickel as the catalyst at a hydrogen pressure of 30 Kg/cm² and a temperature of 150° C. for 1.5 hours thereby to obtain a hydrogenated resin (II)-4 having a softening point of 92° C., bromine value of 21, hydroxyl group content of 0.34 g equivalent/100 g and Gardner color of 3.

Eighty (80) parts of the resin (II)-4, 20 parts of acrylic acid, 1.0 part of p-toluenesulfonic acid and 0.1 part of hydroquinone were reacted together in the same manner as in Example 1 to obtain a resin (III)-4.

EXAMPLE 5

An autoclave was charged with 160 g of the residual oil containing 85% of DCPD as obtained in Example 4, 120 g of 2-hydroxyethyl acrylate and 70 g of xylene to form a mixture which was reacted at 260° C. for 6 hours to obtain 210 g of a resin (I)-3 having a softening point of 92° C., bromine value of 75, hydroxyl group content of 0.31 g equivalent/100 g and Gardner color of 11.

One hundred (100) g of the resin (I)-3 were dissolved in 70 g of xylene and then hydrogenated at a hydrogen pressure of 20 Kg/cm² and a temperature of 100° C. in the presence of 1 g of Palladium-Carbon containing palladium in a concentration of 5% thereby to obtain a hydrogenated resin (II)-5 having a softening point of 90° C., bromine value of 19, hydroxyl group content of 0.29 g equivalent/100 g of Gardner color of 4.

Seventy-five (75) parts of the resin (II)-5, 25 parts of acrylic acid, 1.0 part of p-toluenesulfonic acid and 0.1 part of hydroquinone were reacted together in the same manner as in Example 1 thereby to obtain a resin (III)-5.

COMPARATIVE EXAMPLE 1

Eighty (80) parts of the resin (I)-1 as obtained in Example 1, 20 parts of acrylic acid, 1.0 part of p-toluenesulfonic acid and 0.1 part of hydroquinone were reacted together in benzene/MIBK in the same manner as in Example 1 thereby to obtain a resin A.

COMPARATIVE EXAMPLE 2

Seventy-five (75) parts of the resin (I)-3 as obtained in Example 5, 25 parts of acrylic acid, 1.0 part of p-toluenesulfonic acid and 0.1 part of hydroquinone were reacted together in the same manner as in Example 1 thereby to obtain a resin B.

Using as the vehicles the resins (III)-1, (III)-2, (III)-3, (III)-4 and (III)-5 obtained in Examples 1–5 as well as the resins A and B obtained in Comparative examples 1–2, seven kinds of red offset inks were prepared in accordance with the following formulations, respectively.

| Formulation of Red Offset Inks | |
|---|---|
| Vehicle (Resin of each of the Examples and Comparative examples) | 45 Parts |
| Trimethylolpropane triacrylate | 31 Parts |
| Carmine 6B (T) (Monoazo pigment prepared by Toyo Ink Mfg. Co., Ltd.) | 16 Parts |
| Benzophenone | 7 Parts |
| 4,4'-bisdiethylaminobenzophenone | 1 Part |

The red offset inks so obtained were each printed on art paper (or slick paper) by the use of a monocolor printer, KROD (produced by Heidelberger Bruckmachinene Actiengesellschaft), after which the printed art paper was placed on a conveyor moving 12 cm below a 2-KW high pressure mercury lamp (produced under the trademark of H-2000 L by Toshiba K.K.) to dry the printed art paper by application of radiation from the lamp thereto. The results of evaluation of the inks so tested are shown in the following Table.

Table

| | Evaluation of Ink | | | |
|---|---|---|---|---|
| Resin Used | Sensitivity*¹ | Odor of Printed Matter*² | Washability of Printing*³ Roller Used | Printability*⁴ |
| Example 1 (III)-1 | 28 m/min | None | Easy to clean | No trouble before printing 10000 sheets |
| 2 (III)-2 | 30 m/min | " | " | " |
| 3 (III)-3 | 32 m/min | " | " | " |
| 4 (III)-4 | 28 m/min | " | " | " |
| 5 (III)-5 | 30 m/min | " | " | " |
| Comparative example 1  A | 25 m/min | Offensive odor | Difficult to clean | Uneven prints produced after printing 700 sheets |
| "2  B | 20 m/min | " | " | Uneven prints produced after printing 1000 sheets |

*¹Sensitivity was expressed in terms of conveyor speed required for drying printed matter, the drying being ascertained by finger touch method.
*²odor of dried printed matter.
*³Solvent used for testing washability of rollers was a hydrocarbon solvent mainly contaning an ordinary solvent for cleaning offset inks.
*⁴The printing was effected at a printing speed of 4000 sheets/hr using a printing plate (prepared from a presensitized plate) by the previously mentioned monocolor printer (Model: KORD).

What is claimed is:
1. A process for preparing a radiation or heat curable coating resin (III) comprising the steps of:
hydrogenating selectively the double bonds of a hydroxyl group containing resin (I) produced by reacting

(A) a compound selected from the group consisting of five-membered cyclic compounds having unsaturated conjugated double bonds and being represented by the following general formula

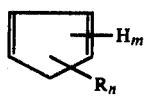

wherein R is an organic residue having 1 to 3 carbon atoms, and m and n are each an integer and are 6 in total, and Diels-Alder's reaction products of the five-membered cyclic compound, with (B) (meth) allyl alcohol to obtain a hydrogenated, hydroxyl group-containing resin (II) and then esterifying the thus obtained resin (II) with at least one member selected from the group consisting of acrylic and methacrylic acids thereby to obtain a curable coating resin (III).

2. A process according to claim 1, wherein the compound (A) is a member selected from the group consisting of cyclopentadiene, dicyclopentadiene, tricyclopentadiene, tetracyclopentadiene and those substituted with a $C_{1-3}$ lower alkyl group.

3. A process according to claim 1, wherein the hydrogenation is effected at a temperature from ambient temperature to 250° C. and a pressure of from atmospheric pressure to 100 Kg/cm$^2$ in the presence of a noble metal catalyst.

4. A process according to claim 1, wherein the hydrogenation is effected at a temperature of ambient temperature to 200° C. and a pressure of atmospheric pressure to 100 Kg/cm$^2$ in the presence of a metallic catalyst other than noble metal catalysts.

5. A process according to claim 1, wherein the resin (II) is esterified with at least one of the acids in the ratios of 1 mol:0.5-1 mol at a temperature of 20°-150° C. under atmospheric, superatmospheric or autogeneous pressure in the presence of an acid catalyst.

6. A process for preparing a radiation or heat curable coating resin (III) comprising the steps of:
hydrogenating selectively the double bonds of a hydroxyl group resin (I) produced by reacting
(A) a compound selected from the group consisting of five-membered cyclic compounds having unsaturated conjugated double bonds and being represented by the following general formula

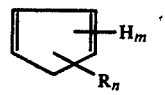

wherein R is an organic residue having 1 to 3 carbon atoms, and m and n are each an integer and are 6 in total, with
(B)(meth) allyl alcohol to obtain a hydrogenated, hydroxyl group-containing resin (II) and then esterifying the thus obtained resin (II) with at least one member selected from the group consisting of acrylic acid methacrylic acids thereby to obtain a curable coating resin (III).

7. A curable coating resin obtained by the process of claim 6.

* * * * *